(12) United States Patent
Tombs et al.

(10) Patent No.: US 7,979,332 B2
(45) Date of Patent: Jul. 12, 2011

(54) METHOD OF BUSINESS VALUATION AND DATA PROCESSING SYSTEM

(75) Inventors: David Tombs, Townsville (AU); Grant Bloxham, Townsville (AU)

(73) Assignee: Bstar IP Pty Ltd., Townsille QLD (AU)

( * ) Notice: Subject to any disclaimer, the term of this patent is extended or adjusted under 35 U.S.C. 154(b) by 356 days.

(21) Appl. No.: 12/051,231

(22) Filed: Mar. 19, 2008

(65) Prior Publication Data

US 2008/0235153 A1    Sep. 25, 2008

(30) Foreign Application Priority Data

Mar. 19, 2007 (AU) ................................ 2007901414

(51) Int. Cl.
*G06Q 40/00* (2006.01)
(52) U.S. Cl. ........................................ 705/35; 705/36 R
(58) Field of Classification Search .................... 705/35, 705/36 R, 37
See application file for complete search history.

(56) References Cited

U.S. PATENT DOCUMENTS

| | | | | |
|---|---|---|---|---|
| 3,693,406 A | * | 9/1972 | Tobin, III | ........................... 73/38 |
| 7,580,848 B2 | * | 8/2009 | Eder | ................................. 705/7 |
| 7,693,733 B2 | * | 4/2010 | Eder | ................................. 705/7 |
| 2003/0046203 A1 | * | 3/2003 | Ichihari et al. | .................. 705/35 |

OTHER PUBLICATIONS

Bstar goes national Transition services in demand; [1 Edition] Townsville Bulletin. Townsville, QId.: Sep. 28, 2005. p. 23.*
Determinants of the capitalization rate: A hierarchical framework Parker, David R R. The Appraisal Journal. Chicago: Apr. 1994. vol. 62, Iss. 2; p. 278, 11 pgs.*
Technical Methods of Business Valuation. Web publication by Ed Alexander.
Valuing Your Business. Web publication of UACPA (2005).

* cited by examiner

*Primary Examiner* — Lalita M Hamilton
(74) *Attorney, Agent, or Firm* — DeLio & Peterson, LLC; Peter W. Peterson

(57) ABSTRACT

A method for valuing a business based on the business generating an acceptable return to an owner during a defined investment period, the method including the steps of assessing the business background for the business to be valued, establishing value optimization factors that determine business value in the light of the business background and the relevant industry of the business to be valued, establishing a business capitalization rate (BCR) appropriate for the business and industry of the business to be valued, calculating a weighted average notional earning before interest and tax (WANEBIT) based on historical financial records of the business to be valued, and calculating the net business value using the WANEBIT and the BCF.

18 Claims, No Drawings

METHOD OF BUSINESS VALUATION AND DATA PROCESSING SYSTEM

FIELD OF THE INVENTION

The present invention relates to business methodologies and particularly to a method of business valuation which produces a business valuation which can then be used in the business for multiple commercial purposes.

BACKGROUND ART

Methods for valuing a business are known. One prior art patent application directed towards such a method is U.S. Pat. No. 6,393,406 to Eder. That document provides an excellent summation of the state of the art as known and a portion of the Background Art section of that patent is reproduced verbatim as follows:

"The valuation of a business is complex and time-consuming undertaking. Business valuations determine the price that a hypothetical buyer would pay for a business under a given set of circumstances. The volume of business valuations being performed each year is increasing significantly. A leading cause of this growth in volume is the increasing use of mergers and acquisitions as vehicles for corporate growth. Business valuations are frequently used in setting the price for a business that is being bought or sold. Another reason for the growth in the volume of business valuations has been their increasing use in areas other than supporting merger and acquisition transactions. For example, business valuations are now being used by financial institutions to determine the amount of credit that should be extended to a company, by courts in determining litigation settlement amounts and by investors in evaluating the performance of company management.

In most cases, a business valuation is completed by an appraiser or a Certified Public Accountant (hereinafter, appraiser) using a combination of judgment, experience and an understanding of generally accepted valuation principles. The two primary types of business valuations that are widely used and accepted are income valuation and asset valuations. Market valuations are also used in some cases but their use is restricted because of the difficulty inherent in trying to compare two different companies.

Income valuations are based on the premise that the current value of a business is a function of the future value that an investor can expect to receive from purchasing all or part of the business. Income valuations are the most widely used type of valuation. They are generally used for valuing businesses that are expected to continue operating for the foreseeable future. In these valuations the expected returns from investing in the business and the risks associated with receiving the expected returns are evaluated by the appraiser. The appraiser then determines the value whereby a hypothetical buyer would receive a sufficient return on the investment to compensate the buyer for the risk associated with receiving the expected returns. Income valuation methods include the capitalization of earnings method, the discounted future income method, the discounted cash flow method, the economic income method and other formula methods. Asset valuations consider the business to be a collection of assets which have an intrinsic value to a third party in an asset sale. Asset valuations are typically used for businesses that are ceasing operation and for specific type of businesses such as holding companies and investment companies. Asset valuation methods include the book value method, the adjusted book value method, the economic balance sheet method and the liquidation method.

Market valuations are used to place a value on one business by using valuations that have been established for comparable businesses in either a public stock market or a recent transaction. This method is difficult to use properly because no two companies are exactly the same and no two transactions are completed for the exact same reasons. Market valuation methods include the price to earnings method, the comparable sales method, industry valuation methods and the comparable investment method.

When performing a business valuation, the appraiser is generally free to select the valuation type and method (or some combination of the methods) in determining the business value. Under the current procedures, there is no correct answer, there is only the best possible informed guess for any given business valuation. There are several difficulties inherent in this approach. First, the reliance on informed guessing places a heavy reliance on the knowledge and experience of the appraiser. The recent increase in the need for business valuations has strained the capacity of existing appraisal organizations. As a result, the average experience level of those performing the valuations has decreased. The situation is even worse for many segments of the American economy where experienced appraisers don't exist because the industries are too new. Another drawback of the current procedures for completing a valuation is that the appraiser is typically retained and paid by a party to a proposed transaction. It is difficult in this situation to be certain that the valuation opinion is unbiased and fair. Given the appraiser's wide latitude for selecting the method, the large variability of experience levels in the industry and the high likelihood of appraiser bias, it is not surprising that it is generally very difficult to compare the valuations of two different appraisers—even for the same business. These limitations in turn serve to seriously diminish the usefulness of business valuations to business managers, business owners and financial institutions.

The usefulness of business valuations to business owners and managers is limited for another reason—valuations typically determine only the value of the business as a whole. To provide information that would be useful in improving the business, the valuation would have to furnish supporting detail that would highlight the value of different elements of the business. An operating manager would then be able to use a series of business valuations to identify elements within a business that have been decreasing in value. This information could also be used to identify corrective action programs and to track the progress that these programs have made in increasing business value. This same information could also be used to identify elements that are contributing to an increase in business value. This information could be used to identify elements where increased levels of investment would have a significant favourable impact on the overall health of the business.

Another limitation of the current methodology is that financial statements and accounting records have traditionally provided the basis for most business valuations. Appraisers generally spend a great deal of time extracting, aggregating, verifying and interpreting the information from accounting systems as part of the valuation process. Accounting records do have the advantage of being prepared in a generally unbiased manner using the consistent framework of Generally Accepted Accounting Principles (hereinafter, GAAP). Unfortunately, these accounting statements have proved to be increasingly inadequate for use in evaluating the financial performance of modem companies.

Many have noted that traditional accounting systems are driving information-age managers to make the wrong decisions and the wrong investments. Accounting systems are "wrong" for one simple reason, they track tangible assets while ignoring intangible assets. Intangible assets such as the skills of the workers, intellectual property, business infrastructure, databases, and relationships with customers and suppliers are not measured with current accounting systems. This oversight is critical because in the present economy the success of an enterprise is determined more by its ability to use its intangible assets than by its ability to amass and control the physical ones that are tracked by traditional accounting systems.

The recent experience of several of the most important companies in the U.S. economy, IBM, General Motors and DEC, illustrates the problems that can arise when intangible asset information is omitted from corporate financial statements. All three were all showing large profits using current accounting systems while their businesses were falling apart If they had been forced to take write-offs when the declines in intangible assets were occurring, the problems would have been visible to the market and management would have been forced to act on them much sooner. These deficiencies of traditional accounting systems are particularly noticeable in high technology companies that are highly valued for their intangible assets and their options to enter new markets rather than their tangible assets.

The accounting profession itself recognizes the limitations of traditional accounting systems. A group of senior financial executives, educators and consultants that had been asked to map the future of financial management by the American Institute of Certified Public Accountants (AICPA) recently concluded that:

a) Operating managers will continue to lose confidence in traditional financial reporting systems, b) The motto of CFOs in the future will likely be "close enough is good enough", and c) The traditional financial report will never again be used as the exclusive basis for any business decisions.

The deficiency of traditional accounting systems is also one of the root causes of the short term focus of many American firms. Because traditional accounting methods ignore intangible assets, expenditures that develop a market or expand the capabilities of an organization are generally shown as expenses that only decrease the current period profit. For example, an expenditure for technical training which increases the value of an employee to an enterprise is an expense while an expenditure to refurbish a piece of furniture is capitalized as an asset.

The dependence on accounting records for valuing business enterprises has to some extent been a matter of simple convenience. Because corporations are required to maintain financial records for tax purposes, accounting statements are available for virtually every company. At the same time, the high cost of data storage has until recently prevented the more detailed information required for valuing intangibles from being readily available. In a similar manner, the absence of integrated corporate databases within corporations and the home-grown nature of most corporate systems has until recently made it difficult to compare similar data from different firms.

The lack of a consistent, well accepted, realistic method for measuring all the elements of business value also prevents some firms from receiving the financing they need to grow. Most banks and lending institutions focus on book value when evaluating the credit worthiness of a business seeking funds. As stated previously, the value of many high technology firms lies primarily in intangible assets and growth options that aren't visible under traditional definitions of accounting book value. As a result, these businesses generally aren't eligible to receive capital from traditional lending sources, even though their financial prospects are generally far superior to those of companies with much higher tangible book values."

The system disclosed in Eder then provides a system which measures the financial performance of all the elements of business value for a given enterprise by automating the extraction of transaction data from the databases, tables, and files of the existing computer-based corporate finance, operation, sales, and human resource software databases as required to operate the system. This resulted in a complex and cumbersome model that would likely miscalculate the value of the business due to a lack of a "reasonableness of assumptions" assessment that an experienced operator would apply in consideration as to the nature of the business and the industry in which the business operates for example.

In light of the preceding discussion, it is clear that it would be advantageous to provide a simple, easy to use valuation system which provides the advantages of the Eder system but based on reasonable assumptions from an experienced operator.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to a method for business valuation, which may at least partially overcome at least one of the above-mentioned disadvantages or provide the consumer with a useful or commercial choice.

In one broad form, the invention resides in a method for valuing a business based on the business generating an acceptable return to an owner during a defined investment period, the method including the steps of:

1. assessing the background of the business and its industry;

2. establishing the parameters that determine the business capitalisation rate (BCR);

3. calculating the BCR based on the established parameters;

4. identifying the notional business profitability; and 5. applying the BCR to the notional business profitability.

The present invention has been developed to calculate the BCR that is relevant to each business based on a number of variables. Being a capitalisation factor, the BCR incorporates the following:

1. current interest rate 2. capitalisation period 3. tax rate 4. free cash flow factor These variables differ between each business and the present invention analyses the correlation between these variables and determines the BCR for the particular business.

In a second form, the invention resides in a method for valuing a business based on the business generating an acceptable return to an owner during a defined investment period, the method including the steps of:

a) Assessing the business background for the business to be valued;
b) Establishing value optimisation factors that determine business value in the light of the business background and the relevant industry of the business to be valued;
c) Establishing a business capitalisation rate (BCR) appropriate for the business and industry of the business to be valued;
d) Calculating a weighted average notional earning before interest and tax (WANEBIT) based on historical financial records of the business to be valued; and
e) Calculating the net business value using the WANEBIT and the BCF.

In a more preferred form, the invention may further include the optional step of:

f) Calculating a free cash flow factor to ascertain ability of a business to finance a debt, including the sub-steps of:
   i. Calculating the business tax liability based on historical financial data;
   ii. Calculating cash available based on WANEBIT less business tax liability; and
   iii. Calculating free cash flow factor according to the ratio of cash available to repayment amounts with a minimum acceptable value of 1.2.

In an optional preferred form, the invention may further include the optional step of:

g) checking that the business capitalisation rate (BCR) established in step (c) is viable, including the sub-steps of:
   i. calculating a peak notional business value ratio (PNBVR) of net business value from step (e) to total income for an appropriate historical period;
   ii. calculating WANEBIT as a percentage of total income for the appropriate historical period;
   iii. calculating the business capitalisation rate as a ratio of PNBVR to WANEBIT as a percentage of total income; and
   iv. comparing the business capitalisation rate to industry levels for reasonableness.

In a third form, the invention resides in a data processing system for valuing a business including a) processing means for processing data;
b) storage means for storing data;
c) first means for obtaining data related to the financial performance of a business to be valued, including at least an income component, and an expense component;
d) second means for establishing a business capitalisation rate (BCR) appropriate for the business and industry of the business to be valued;
e) third means for calculating a weighted average notional earning before interest and tax (WANEBIT) based on historical financial records of the business to be valued; and
f) fourth means for calculating the net business value using the WANEBIT and the BCF.

In a more preferred form, the invention may further include:

g) fifth means for checking that the business capitalisation rate (BCR) established in step (c) is viable by:
   i. calculating a peak notional business value ratio (PNBVR) using the net business value from step (f) to total income for an appropriate historical period;
   ii. calculating WANEBIT as a percentage of total income for the historical period;
   iii. calculating the business capitalisation rate as a ratio of PNBVR to WANEBIT as a percentage of total income; and
   iv. iteratively comparing the business capitalisation rate calculated in step (iii) to that established in feature (d).

The present invention may be used in situations where a business wishes to value itself or where the business may wish to value itself in the evaluation of a potential purchase of an asset. The asset may be as simple as a fixed plant asset or may be as complex as the purchase of another business venture as an asset. The method and system of the present invention are preferably based on an earnings capacity of the business and any future sale price of a business is likely to require adjustment to account for other items such as working capital, unrecorded liabilities, expiring assets and the like, that form a part of the business sale.

There are generally key success factors that determine business value. These factors indicate the degree to which a business may be able to increase its value and identify areas where the business may be at risk from inappropriate management practices. These key success factors include:

Management Information Systems

Management Information Systems (MIS) provide business owners and managers with accurate and timely information. Job costing, customer relationship management (CRM) and management accounting systems are examples of a functioning MIS.

Management, Business and Personal Experience

The business owner has a solid knowledge of the business. Importantly, the business owner recognises the need to seek external professional assistance where necessary and to establish a balance between business and family life Customers and Market Demand The business owner has a thorough understanding of the products and services that are relevant to the industry and is aware of the opportunities available through market/customer analysis and the need to deliver a high level of customer service.

Human Resource Management

The business owner, is aware of (and either adopts or is in the process of adopting) contemporary HR management techniques.

Growth, Succession and Estate Planning

The business does have a certain level of dependence on the business owner, who recognises this and appreciates that as the business grows the business owner can train and mentor incoming key staff members to be able to run the business in the absence of the owner.

Assessment Methodology

The preferred invention is embodied in a valuation model that determines a value for a business based on the business generating an acceptable return to an owner during a defined investment period.

The valuation methodology typically considers:

1. Profitability and Servicing—the business generating sufficient cash flows after tax (from profits) to provide a return on business investment;
2. Investment Payback Period—the maximum investment period based on an assessment of business risk;
3. Cost of Capital—most small to medium enterprise business investment is funded by bank debt.

A key component in calculating business value is the determination of an appropriate capitalisation factor. The capitalisation factor will vary from business to business.

The valuation methodology determining the appropriate capitalisation factor of the present invention is preferably based on quantitative and qualitative analysis of all facets of business operations and incorporates the principles of Porter's Five-Forces Model, financial modelling and generally accepted credit standards.

Porter's Five Forces Model is a model used to analyse a particular environment of an industry. The five forces defined in Porter's model are:
1) Competitive Rivalry
2) Power of suppliers
3) Power of buyers
4) Threats of substitutes
5) Threat of new entrants.

The above five main factors are thought to be the key factors that influence industry performance. According to the present invention, the significance of the risk associated with each factor is preferably assessed using particular considerations which are specific to the factor. The significance of the risk associated with each consideration is then preferably given a quantitative value and then the risk of each factor is summarised to establish a quantitative value of risk of the business.

Competitive Rivalry

A starting point to analysing the industry is to investigate competitive rivalry. If entry to an industry is easy then competitive rivalry will likely to be high. If it is easy for customers to move to substitute products, then again rivalry will be high. Generally competitive rivalry will be high if:
  There is little differentiation between the products sold between customers.
  Competitors are approximately the same size of each other.
  If the competitors all have similar strategies.
  It is costly to leave the industry hence they fight to just stay in (exit barriers).

The considerations used for this factor preferably include:

| Consideration | Risk Exists? | Significance of Risk* |
|---|---|---|
| The market comprises a number of similar sized businesses | | |
| Competitors have aggressive growth strategies | | |
| Little product/service differentiation exists | | |
| Low market growth exists | | |
| Fixed costs in the industry are high (therefore high revenues are required) | | |
| Storage costs are high and/or perishable goods are involved | | |
| Exit costs are high | | |
| Competitors have access to greater resources than the business | | |
| Switching costs are low for the customer | | |

*(Score 1 to 5, 1 is minimal; 5 is high).

Power of Suppliers

Suppliers are also essential for the success of an organisation. Raw materials are needed to complete the finish product of the organisation and suppliers do have power. This power comes from:
  If they are the only supplier or one of few suppliers who supply that particular raw material.
  If it is costly for the organisation to move from one supplier to another (known also as switching cost)
  If there is no other substitute for their product.

The considerations used for this factor preferably include:

| Consideration | Risk Exists? | Significance of Risk* |
|---|---|---|
| Supply Market is dominated by a few large suppliers | | |
| The business is restricted in its number of sources for these supplies | | |
| Suppliers are concentrated (bargaining power is high) | | |
| Changing Suppliers is costly/difficult | | |
| Suppliers may 'forward integrate' and become a competitor | | |
| The customers of the business are able to influence which suppliers are engaged by the business | | |

*(Score 1 to 5, 1 is minimal; 5 is high).

Power of Buyers

Buyers or customers can exert influence and control over an industry in certain circumstances. This happens when:
  There is little differentiation over the product and substitutes can be found easily.
  Customers are sensitive to price.
  Switching to another product is not costly.

The considerations used for this factor preferably include:

| Consideration | Risk Exists? | Significance of Risk* |
|---|---|---|
| The buying industry is dominated by a few large customers | | |
| The business's current customer mix is dominated by a few large customers | | |
| The business has little or no product/service differentiation | | |
| Buyers may 'backward integrate' and become a competitor | | |
| Customers can continue to operate without the products/services provided by the business | | |
| The business has high levels of fixed costs | | |
| The customer can easily change suppliers | | |
| Customers are price sensitive | | |

*(Score 1 to 5, 1 is minimal; 5 is high).

Threat of Substitutes

Are there alternative products that customers can purchase over your product that offer the same benefit for the same or less price? The threat of substitute is high when:
  Price of that substitute product falls.
  It is easy for consumers to switch from one substitute product to another.
  Buyers are willing to substitute.

The considerations used for this factor preferably include:

| Consideration | Risk Exists? | Significance of Risk* |
|---|---|---|
| Customers have low levels of brand loyalty | | |
| The customer can easily substitute its requirements | | |
| Substitutes can be provided in a cost effective manner | | |

*(Score 1 to 5, 1 is minimal; 5 is high).

Threat of New Entrant

The threat of a new organisation entering the industry is high when it is easy for an organisation to enter the industry i.e. entry barriers are low.

An organisation will look at how loyal customers are to existing products, how quickly they can achieve economy of scales, would they have access to suppliers, and would government legislation prevent them or encourage them to enter the industry as examples.

The considerations used for this factor preferably include:

| Consideration | Risk Exists? | Significance of Risk* |
|---|---|---|
| Low financial cost of entry exists for new entry | | |
| Low technical/regulatory/intellectual property cost of entry exists for new entrants | | |
| Resources (including labour and access to distribution channels) required for a new entrant are readily accessible | | |
| Customers have low levels of brand loyalty | | |
| Industry is seen as buoyant and profitable | | |
| New competitors can survive on low market share | | |
| Low cost exists for unsuccessful new entrants | | |

*(Score 1 to 5, 1 is minimal; 5 is high).

As discussed above, once the significance of the risk associated with each of the considerations related to the respective factors has been evaluated for the business to be valued, a summary of the risk can then be prepared allowing calculation of an overall quantitative risk value for the business. This is normally prepared according to the following table:

| Force | Number of Considerations | Number Answered | Max Risk Score | Risk Score | % |
|---|---|---|---|---|---|
| Bargaining Power of Suppliers | 6 | | 30 | | |
| Bargaining Power of Customers | 8 | | 40 | | |
| Threat of New Entrants | 7 | | 35 | | |
| Threat of Substitutes | 3 | | 15 | | |
| Competitive Rivalry between Existing Players | 9 | | 45 | | |
| Total | 33 | | 160 | | |

If any of the considerations were not answered, that preferably reduces the maximum risk score possible in the above table.

However, it is also preferable that all parties be aware of the need to continually identify, assess and manage business risks that exist in today's dynamic environment. This may result in the abovementioned risk assessment being performed at specified period in an ongoing manner.

Further, the present invention is preferably based on a certain set of assumptions. Some assumptions are pre-determined or set by outside forces and/or organisations such as the appropriate company taxation rate but others will preferably be determined by an appropriately skilled operator as a matter of judgement by applying the methodology and giving consideration to the nature of the particular business to be valued and the industry in which the business to be valued operates as an example.

The assumptions of the preferred embodiment include the adoption of a value for each of the following, although others may be added to the list or alternatives used:

Debt Coverage Multiple—the minimum acceptable debt coverage ratio will typically be 1.2 and may be as high as 1.5, but is typically within that range.

Investment Payback period—where a business has agreed to purchase or is purchasing an asset (another business or other asset), a period in which the asset is expected to be fully paid for is typically calculated. A generally accepted range can apply depending upon matters affecting the business environment. For example, in a low risk environment, a period of between 3-10 years may be reasonable. This is typically used to calculate loan repayments, and related financial amounts which can then be used in the valuation methodology.

Cost of Capital—typically standard market rates for cost of capital can be used. For example, a standard rate for commercial borrowing may be approximately 8-10%.

Tax Rate—This is normally set by a government taxation department but will depend upon factors such as the size of the business, the type of business, company structure and possibly income of the business.

Earnings before interest and tax—this amount can be calculated using historical financial data if available or extrapolated from existing details for the business to be valued.

The Earnings Before Interest and Tax (EBIT) figure is typically weighted according to the year in which the earnings occurred. It is also typically adjusted for any "non-commercial" items such as intra-group sales/purchases at non-market rates, above market rates of superannuation paid to owners or the like.

Once these assumptions are adopted, they can then be used in the valuation method and system of the present invention but the validity of the outcome of the valuation method and system is always dependent upon the validity of the assumptions. If poor assumptions are made, then the net business value resulting from the valuation method and system will be flawed.

The net business value is arrived at through an application of the above-discussed methodology, system and principles and through the calculation of a number of different indicators based upon the earnings of the business. An example of the calculation process and formulae applied according to a particularly preferred embodiment is outlined in the table below:

| | | B | C | D |
|---|---|---|---|---|
| 1 | A | | | |
| 2 | | Weighted Average Notional EBIT | | |
| 3 | | 2 yr Previous | 1 yr Previous | Last Fin Year |
| 4 | Earnings Before Interest and Tax (EBIT) | Accounts | Accounts | Accounts |
| 5 | Adjustments | | | |
| 6 | Adjusted EBIT | | | |
| 7 | Weighting Factor* (See Note below) | | | |

| | | | | |
|---|---|---|---|---|
| 8 | Weighted Values | B6 × B7 | C6 × C7 | D6 × D7 |
| 9 | Weighted Average Notional EBIT (WANEBIT) | | | Σ(B8, C8, D8)/ Σ(B7, C7, D7) |
| 10 | Total Income | | | Accounts |
| 11 | WANEBIT as % of Total Income | | | D9/D10 |
| 12 | Free Cash Flow Factor | | | |
| 13 | Standard Ratio | | | D30 |
| 14 | Business Capitalisation Rate | | | |
| 15 | Business Capitalisation Rate | Interest Rate | Term (yrs) | |
| 16 | Result | | | Is BCR OK? |
| 17 | NOTIONAL BUSINESS VALUE (NB) | | | ANSWER |
| 18 | Annual Repayments | Interest From Loan Calculator | Principal From Loan Calculator | From Loan Calculator |
| 19 | Tax Payment Calculation | | | |
| 20 | Last Year EBIT | | | D6 |
| 21 | Less Interest | | | B18 |
| 22 | Tax Payment (Estimate) | Tax Rate % | | (D20 − D21) × B22 |
| 23 | Cash Available to Service Notional Business Value (CASNBV) Calculation | | | |
| 24 | WANEBIT | | | D9 |
| 25 | Less Tax payment (Estimate) | | | D22 |
| 26 | CASNBV | | | D24 − D25 |
| 27 | Free Cash Flow Factor Calculation | | | |
| 28 | CASNBV | | | D26 |
| 29 | Annual Repayment (Estimate) | | | D18 |
| 30 | Free Cash Flow Factor (Times) | | | D28/D29 |
| 31 | Peak Notional Business Value Ratio | | | |
| 32 | Peak National Business Value | | | D17 |
| 33 | Total Income for last financial year | | | D10 |
| 34 | Peak NBV Ratio (PNBVR) | | | D32/D33 |
| 35 | Notional Business Value | | | |
| 36 | PNBVR | | | D34 |
| 37 | Weighted Average Notional EBIT % | | | D11 |
| 38 | Notional Business Value | | | D17 |

*Note: Based on three years availability of financial reports. If only two years are available, adjust weighting, that is, last financial year has a weighting of 2 and 1 year previous has a weighting of 1.

DETAILED DESCRIPTION OF THE PREFERRED EMBODIMENT

According to a preferred aspect of the invention, a data processing system for calculating a business value is provided, as is a method for calculating a business value.

The system of the present invention incorporates several different concepts in its valuation model. These concepts include:
Free Cash Factors
variable Repayment Terms
incorporation of accounting profits, earnings before interest and tax and weighted notional average earnings before interest and tax
Cash Available to Service Notional Business Values
notional tax estimates and other adjustments used to determine the underlying commercial performance of a business The way the system uses a BCR to determine a business valuation that satisfies the requirements (and cross-relationships) of these factors is complicated and unique.

By way of introduction, the model can be described as adopting the following principles:
the value of a business can be represented by an amount that a willing buyer would pay for the business in an arm's length transaction
the purchase of a business is an investment decision which will generate future cash flows to the purchaser
the amount that a purchaser will pay for a business is related to the future net cash flows that the business will generate
the buyer will not pay more than the capital value of future cash flows
the seller will not sell for less than the capital value of future cash flows
the value of the business is therefore determined by the capital value of future cash flows Capital Value of Future Cash Flows The capital value of future cash flows of a business can be determined by applying the following principle:

"What size loan can the future cash flows of the business afford to service?" This is viewed as a reasonable representation as it shows:

a) how much an independent third party could reasonably be expected to borrow to buy the business and repay the borrowings from the profits of the business, and b) the borrowing capacity of the business (which can be interpreted as representing the 'capital worth' of the business)

In some respects, the present system resembles a mortgage calculator and it is useful to start this demonstration with a review of how a mortgage calculator works, Mortgage Calculations As an example, assume that:
1. someone wishes to borrow $1,000,000
2. interest rates are 9% and
3. the loan will be repaid over 10 years, with monthly repayments.

Compound interest formulae show that, under such a scheme, the annual repayments would be $152,010. Total repayments would therefore be $1,520,100 split between:
total capital repayments of $1,000,000 and
total interest repayments of $520,100 example shows that an annual revenue stream of $152,100 can service a 10 year loan (at 9% with monthly repayments) of $1,000,000.

The system applies this methodology to say that an annual revenue stream of $152,100 has a capital value (over 10 years, at 9% with monthly repayments) of $1,000,000.

This is the same as saying that, over 10 years at 9% and monthly repayments, an income stream has a capital value of 6.55 times its amount (ie $1,000,000/$152,100=6.55). Thus, using these parameters, 6.55 is the Capitalisation Factor for this income stream using these variables.

Business Valuations

The system embodying this methodology can be applied to the business environment.

The present system incorporates a number of new variables and applies the following steps:

The 'revenue stream' is represented by the profits that a business makes. These are calculated by adjusting the accounting profits for any non-commercial (ie non arm's length) transactions that are included therein. For example, many small businesses pay the directors and owners 'above market' salaries and superannuation amounts and might charge some private vehicle and travel costs through the business. Such transactions artificially increase the expenses of the business and therefore understate the profitability of the business. By reversing such transactions the underlying commercial profitability of the business can be established. This is the amount that determines the value of a business.

The system also reverses out interest receivable and payable and other non-operational transactions as these do not represent the underlying commercial profitability of the business. The resulting figure is referred to as the Notional Earnings Before Interest and Tax ("NEBIT").

The system recognises that a business valuation model based on single year's performance/profitability is subject to distorting influences. To counter this, the Bstar model uses a three year weighted average of NEBITS, weighted 3:2:1 in favour of the most recent year. The resulting figure is referred to as the Weighted Average NEBIT ("WANEBIT"). An example of these calculations is shown as Appendix 1.

A notional business value is obtained by applying the relevant BCR to the WANEBIT of a business.

Suitable BCR

The notional business value ("NBV") basically represents the capital value of the WANEBIT (ie its revenue stream).

The system tests the NBV to make sure that it can be supported by the revenue stream of the business. For example, the model determines whether the revenue stream of the business would be able to service a capital sum equivalent to the NBV. Where it cannot, the BCR is too high.

This system achieves this by comparing the relationship that exists between two figures:

a) the Annual Repayments that would be required to repay a loan equivalent to the NBV, and b) the net cash available to the business to finance a capital sum equivalent to the NBV ("Cash Available to Service Notional Business Value—CASNBV")

The system recognises that, in a commercial environment, an independent third party who borrowed the money to buy the business with the intention of repaying the loan from future profits would require some sort of a 'buffer' between annual repayments and annual profits. Such a buffer would also be required by a Bank before they would lend the money using the business as security. This buffer is known as the Free Cash Flow Factor ("FCF").

Using a FCF of 20%, the FCF dictates that to service a loan which has annual repayments of $310,000, an 'annual available cash' amount of $372,000 is required (ie $310,000*1.2).

Annual Repayments

A mortgage calculator can easily provide the annual repayment amount that applies for each different BCR that is applied to a given WANEBIT figure (using various interest rates and repayment terms).

The mortgage calculator also differentiates these repayments between interest amounts and capital amounts. At the beginning of the repayment term, the majority of each instalment is used for Interest. Over the life of the mortgage, the proportion of each instalment that is used for Interest decreases.

The mortgage calculator included as Appendix 2 shows that a capital value of $2,038,233 (using a 10 year term and 9% interest, repayable monthly) has an annual repayment requirement of $309,834 (ie $310,000 rounded).

The mortgage calculator also shows that, in the first year, the interest component of these repayments is $178,095.

CASNBV

The CASNBV is determined by calculating the available cash amount that a business would have at its disposal. This is determined by its profitability (pre tax) less a notional amount of tax (refer Appendix 3 to see how this is calculated by the preferred embodiment). This provides a CASNBV which represents the notional underlying commercial performance of the business.

CASNBV is calculated by deducting a notional tax figure from the WANEBIT figure.

In this example, WANEBIT is $433,667 and the notional tax estimate is $60,572. This provides a CASNBV of $373,095.

The present invention of the present invention determines the BCR that provides a CASNBV marginally higher than the annual repayment as adjusted by the FCF.

Free Cash Flow Factor

Where the CASNBV reduced by the Free Cash Factor is marginally higher than the annual repayment, the BCR is acceptable:

1) the BCR determines the NBV and so directly impacts upon the annual repayments 2) the BCR indirectly impacts on the CASNBV by affecting the tax estimate that is used to calculate the CASNBV Where the BCR is too high, the business will be overvalued and its CASNBV will not be able to service the Annual Repayments.

The preferred embodiment recognises that certain industries are more cash intensive than others. Such industries may have their Free Cash Flow Factor increased to higher levels.

Repayment Term

The present invention recognises that different industries and businesses are subject to different levels of risk and uncertainty. The preferred embodiment includes an assessment being of these risks and uncertainties. Where moderate to high levels of risk and uncertainty are identified, the repayment term is reduced. This has the effect of reducing the BCR.

A business that is unable to demonstrate a history of stable profits is deemed to operate in an area of uncertainty and therefore generally not have a repayment term of 10 years.

From a conceptual point of view, the repayment term can be translated as being "over what period of time would an investor want to recoup his/her investment in this business?". This line of thinking demonstrates that higher risk/uncertain businesses will have a lower repayment term.

SUMMARY

The present system is unique as it incorporates several new concepts to a valuation model. These new concepts include:
Free Cash Factors
variable Repayment Terms
incorporation of accounting profits, earnings before interest and tax and weighted average earnings before interest and tax
Cash Available to Service Notional Business Values
notional tax estimates and other adjustments used to determine the underlying commercial performance of a business The manner in which the present invention determines a business valuation that satisfies the requirements (and cross-relationships) of these factors is complicated and unique.

As can be seen, an infinite number of potential scenarios exist with these variables. The system is able to provide a Business Capitalisation Rate for each and every one.

The inventors experimentation with the system has enabled the production of the following table, which includes a selection of BCR's, based on the following scenarios:

|   | Year 1 EBIT | Year 2 EBIT | Year 3 EBIT | Year 1 Adj EBIT | Year 2 Adj EBIT | Year 3 Adj EBIT | Free Cash Flow factor | Interest | Repayment Term | Tax Rate | BCR | Business Value |
|---|---|---|---|---|---|---|---|---|---|---|---|---|
| A | 100,000 | 200,000 | 300,000 | 100,000 | 200,000 | 300,000 | 1.2 | 9% | 10 | 30% | 3.90 | $0.9 m |
| 1 | 200,000 | 250,000 | 300,000 | 200,000 | 250,000 | 300,000 | 1.2 | 9% | 10 | 30% | 4.22 | $1.1 m |
| 2 | 100,000 | 200,000 | 300,000 | 150,000 | 250,000 | 350,000 | 1.2 | 9% | 10 | 30% | 4.35 | $1.2 m |
| 3 | 100,000 | 200,000 | 300,000 | 100,000 | 200,000 | 300,000 | 1.4 | 9% | 10 | 30% | 3.28 | $0.8 m |
| 4 | 100,000 | 200,000 | 300,000 | 100,000 | 200,000 | 300,000 | 1.2 | 9% | 7 | 30% | 2.97 | $0.7 m |
| 5 | 100,000 | 200,000 | 300,000 | 100,000 | 200,000 | 300,000 | 1.4 | 9% | 7 | 30% | 2.50 | $0.6 m |

Key:
EBIT Earnings Before Interest and Tax (for these purposes, this is assumed to equal Accounting Net Profit
BCR Business Capitalisation Rate The following explanations relate to each different scenario when compared to Example A above

| | |
|---|---|
| 1 | Shows that higher levels of EBIT and Adjusted EBIT result in a higher BCR |
| 2 | Shows that similar levels of EBIT, but higher Adjusted EBIT results in higher BCR |
| 3 | Shows that a higher Free Cash Flow Factor results in a lower BCR |
| 4 | Shows that a lower Repayment Term results in a lower BCR |
| 5 | Shows that a higher Free Cash Flow Factor AND a lower Repayment Term reduces the BCR further |

Appendix 1 : calculation of the underlying commercial profitability of the business (weighted average notional earnings before interest and tax)

Summary of last three years' financial statements:

|  | 2XX1 | 2XX2 | 2XX3 |
|---|---|---|---|
|  | $ | $ | $ |
| Trading income | 800,000 | 850,000 | 900,000 |
| Interest income | 25,000 | 30,000 | 40,000 |
| Total Income | 825,000 | 880,000 | 940,000 |
|  |  |  |  |
| Owners wages | 100,000 | 140,000 | 160,000 |
| Owners superannuation | 10,000 | 20,000 | 25,000 |
| Other wages | 290,000 | 273,000 | 282,000 |
| Other superannuation | 30,000 | 27,000 | 28,000 |
| Private travel | 15,000 | 20,000 | 25,000 |
| Total Expenses | 445,000 | 480,000 | 520,000 |
|  |  |  |  |
| Accounting Profit | 380,000 | 400,000 | 420,000 |

Assuming that 'commercial' owners wages during this period were $100,000 in 2XX1 and increased by $10,000 per annum during this period, and that commercial superannuation was 10% of wages, the weighted average notional earnings before interest and tax for these years is as follows:

|  | 2XX1 | 2XX2 | 2XX3 |
|---|---|---|---|
|  | $ | $ | $ |
| Accounting Profit | 380,000 | 400,000 | 420,000 |
| Less Interest Income | (25,000) | (30,000) | (40,000) |
| Add back excess wages | 0 | 30,000 | 40,000 |
| Add back excess super |  | 9,000 | 13,000 |
| Add back private travel | 15,0000 | 20,000 | 25,000 |
| NEBIT | 370,000 | 429,000 | 458,000 |
| Weightings | 1 | 2 | 3 |
| Weighted NEBITs | 370,000 | 858,000 | 1,374,000 |
|  |  |  |  |
| WANEBIT |  |  | 433,667 |

Appendix 2 mortgage calculator

LOAN AMORTIZATION - EQUAL PAYMENTS

| Principal | $ | 2036233.33 |
|---|---|---|
| Period of loan (months) | | 120.00 |
| Years to maturity | years | 10 |
| Annual interest rate | % | 9.00 |
| Payments per year | | 12 |
| Periodic interest rate | % | 0.75 |
| Would you prefer a periodic (1) or annual (2) Loan Amortization Schedule: | | 1 |

| Principal | Interest | Total Payments |
|---|---|---|
| $131,739 | $178,095 | $309,834 |

Loan Amortization Schedule

| Period | Interest Payments | Principal Payments | Total Payments | Loan Balance | Cumulative Interest |
|---|---|---|---|---|---|
| | | | | 2036233.33 | |
| 1 | 15286.75 | 10532.73 | 25819.48 | 2027700.60 | 15286.75 |
| 2 | 15207.75 | 10611.72 | 25819.48 | 2017088.88 | 30494.50 |
| 3 | 15128.17 | 10691.31 | 25819.48 | 2006397.57 | 45622.67 |
| 4 | 15047.98 | 10771.50 | 25819.48 | 1995626.07 | 60670.65 |
| 5 | 14967.20 | 10852.28 | 25819.48 | 1984773.79 | 75637.85 |
| 6 | 14885.80 | 10933.68 | 25819.48 | 1973840.11 | 90523.65 |
| 7 | 14803.80 | 11015.68 | 25819.48 | 1962824.44 | 105327.45 |
| 8 | 14721.18 | 11098.30 | 25819.48 | 1951726.14 | 120048.64 |
| 9 | 14637.95 | 11181.53 | 25819.48 | 1940544.61 | 134686.58 |
| 10 | 14554.08 | 11265.39 | 25819.48 | 1929279.22 | 149240.67 |
| 11 | 14469.59 | 11349.88 | 25819.48 | 1917929.33 | 163710.26 |
| 12 | 14384.47 | 11435.01 | 25819.48 | 1906494.32 | 178094.73 |
| 13 | 14298.71 | 11520.77 | 25819.48 | 1894973.55 | 192393.44 |
| 14 | 14212.30 | 11607.18 | 25819.48 | 1883366.37 | 206605.74 |
| 15 | 14125.25 | 11694.23 | 25819.48 | 1871672.14 | 220730.99 |
| 16 | 14037.54 | 11781.94 | 25819.48 | 1859890.21 | 234768.53 |
| 17 | 13949.18 | 11870.30 | 25819.48 | 1848019.90 | 248717.71 |
| 18 | 13860.15 | 11959.33 | 25819.48 | 1836060.58 | 262577.86 |
| 19 | 13770.45 | 12049.02 | 25819.48 | 1824011.55 | 276348.31 |
| 20 | 13680.09 | 12139.39 | 25819.48 | 1811872.16 | 290028.40 |
| 21 | 13589.04 | 12230.43 | 25819.48 | 1799641.72 | 303617.44 |
| 22 | 13497.31 | 12322.17 | 25819.48 | 1787319.56 | 317114.75 |
| 23 | 13404.90 | 12414.58 | 25819.48 | 1774904.98 | 330519.65 |
| 24 | 13311.79 | 12507.69 | 25819.48 | 1762397.28 | 343831.43 |
| 25 | 13217.95 | 12601.50 | 25819.48 | 1749795.79 | 357049.41 |
| 26 | 13123.47 | 12696.01 | 25819.48 | 1737099.78 | 370172.88 |
| 27 | 13028.25 | 12791.23 | 25819.48 | 1724308.54 | 383201.13 |
| 28 | 12932.31 | 12887.16 | 25819.48 | 1711421.38 | 396133.44 |
| 29 | 12835.66 | 12983.82 | 25819.48 | 1698437.56 | 408969.10 |
| 30 | 12738.28 | 13081.20 | 25819.48 | 1685356.37 | 421707.39 |
| 31 | 12640.17 | 13179.31 | 25819.48 | 1672177.06 | 434347.56 |
| 32 | 12541.33 | 13278.15 | 25819.48 | 1658898.91 | 446888.89 |
| 33 | 12441.74 | 13377.74 | 25819.48 | 1645521.17 | 459330.63 |
| 34 | 12341.41 | 13478.07 | 25819.48 | 1632043.10 | 471672.04 |
| 35 | 12240.32 | 13579.16 | 25819.48 | 1618463.95 | 483912.36 |
| 36 | 12138.48 | 13681.00 | 25819.48 | 1604782.95 | 496050.84 |
| 37 | 12035.87 | 13783.61 | 25819.48 | 1590999.34 | 508086.71 |
| 38 | 11932.50 | 13886.98 | 25819.48 | 1577112.36 | 520019.21 |
| 39 | 11828.34 | 13991.14 | 25819.48 | 1563121.22 | 531847.55 |
| 40 | 11723.41 | 14096.07 | 25819.48 | 1549025.15 | 543570.96 |
| 41 | 11617.69 | 14201.79 | 25819.48 | 1534823.36 | 555188.65 |
| 42 | 11511.18 | 14308.30 | 25819.48 | 1520515.06 | 566699.82 |
| 43 | 11403.86 | 14415.62 | 25819.48 | 1506099.45 | 578103.69 |
| 44 | 11295.75 | 14523.73 | 25819.48 | 1491575.71 | 589399.43 |
| 45 | 11186.82 | 14632.66 | 25819.48 | 1476943.05 | 600586.25 |
| 46 | 11077.07 | 14742.41 | 25819.48 | 1462200.65 | 611663.32 |
| 47 | 10966.50 | 14852.97 | 25819.48 | 1447347.67 | 622629.83 |
| 48 | 10855.11 | 14964.37 | 25819.48 | 1432383.30 | 633484.94 |
| 49 | 10742.87 | 15076.60 | 25819.48 | 1417306.70 | 644227.81 |
| 50 | 10629.80 | 15189.68 | 25819.48 | 1402117.02 | 654857.61 |
| 51 | 10515.88 | 15303.60 | 25819.48 | 1386813.42 | 665373.49 |
| 52 | 10401.10 | 15418.38 | 25819.48 | 1371395.04 | 675774.59 |
| 53 | 10285.46 | 15534.02 | 25819.48 | 1355861.03 | 686060.05 |
| 54 | 10168.95 | 15650.52 | 25819.48 | 1340210.51 | 696229.01 |
| 55 | 10051.58 | 15767.90 | 25819.48 | 1324442.61 | 706280.59 |
| 56 | 9933.32 | 15886.16 | 25819.48 | 1308556.45 | 716213.91 |
| 57 | 9814.17 | 16005.31 | 25819.48 | 1292551.14 | 726028.08 |
| 58 | 9694.13 | 16125.34 | 25819.48 | 1276425.80 | 735722.21 |
| 59 | 9573.19 | 16246.28 | 25819.48 | 1260179.51 | 745295.41 |
| 60 | 9451.35 | 16368.13 | 25819.48 | 1243811.38 | 754746.75 |
| 61 | 9328.59 | 16490.89 | 25819.48 | 1227320.49 | 764075.34 |
| 62 | 9204.90 | 16614.57 | 25819.48 | 1210705.91 | 773280.24 |
| 63 | 9080.29 | 16739.18 | 25819.48 | 1193966.73 | 782360.54 |
| 64 | 8954.75 | 16864.73 | 25819.48 | 1177102.00 | 791315.29 |
| 65 | 8828.26 | 16991.21 | 25819.48 | 1160110.79 | 800143.55 |
| 66 | 8700.83 | 17118.65 | 25819.48 | 1142992.14 | 808844.38 |
| 67 | 8572.44 | 17247.04 | 25819.48 | 1125745.10 | 817416.82 |
| 68 | 8443.09 | 17376.39 | 25819.48 | 1108368.71 | 825859.91 |
| 69 | 8312.77 | 17506.71 | 25819.48 | 1090862.00 | 834172.68 |
| 70 | 8181.46 | 17638.01 | 25819.48 | 1073223.98 | 842354.14 |
| 71 | 8049.18 | 17770.30 | 25819.48 | 1055453.69 | 850403.32 |
| 72 | 7915.90 | 17903.58 | 25819.48 | 1037550.11 | 858319.23 |
| 73 | 7781.63 | 18037.85 | 25819.48 | 1019512.26 | 866100.85 |
| 74 | 7646.34 | 18173.14 | 25819.48 | 1001339.12 | 873747.19 |
| 75 | 7510.04 | 18309.44 | 25819.48 | 983029.69 | 881257.24 |

| | |
|---|---|
| annual int | 0.00 |
| periodic int | 0.0075 |
| # of periods | 120.00 |
| current period | 120.00 |
| coeff 4 annual pymt | 0.06 |
| current int | 0.0075 |
| Payment | $25,819.48 |

Appendix 3 : determining a notional tax liability

This aims to determine the net revenue stream of the business (ie after tax) as this would be the amount that would be used to service the capital sum, were it to be borrowed by the business The model determines a notional tax figure by the following process:

1) determine last year's EBIT 2) assume that someone has borrowed the money to buy the business, based on its NBV as calculated by applying a BCR to its WANEBIT : they would incur an additional (notional) interest expense of the first year's interest component of the Annual Repayments. Reduce the EBIT by this Interest amount 3) apply the appropriate tax rate to determine a Notional Tax figure

| | |
|---|---|
| Last year EBIT | $380,000 |
| Less notional interest | |
| (ie first year interest as per mortgage calculator) | $178,095 |
| Notional Taxable Income | $201,905 |
| Notional Tax at 30% | $60,572 |

NOTIONAL BUSINESS VALUE MODEL - BUSINESS CAPITALISATION RATE CALCULATION

Weighted Average Notional EBIT

|  | 2 yr previous | 1 yr previous | Last FY |
|---|---|---|---|
| EBIT | $355,000 | $370,000 | $380,000 |
| Adjustments | $15,000 | $59,000 | $78,000 |
| Adjusted EBIT | $370,000 | $429,000 | $458,000 |
| Weighting Factors (*See note below) | 1 | 2 | 3 |
| Weighted Values | $370,000 | $858,000 | $1,374,000 |
| Weighted Average Notional EBIT |  |  | $433,667 |
| Total Income |  |  | $1,000,000 |
| WANEBIT as % of Income |  |  | 43.4% |

Free Cash Flow Factor

| Standard Ratio (Range 1.2 - 1.5) | 1.2 |
|---|---|

Business Capitalisation Rate

|  | Interest Rate | Term (yrs) |  |
|---|---|---|---|
| Business Capitalisation Rate | 9.0% | 10 | 4.70 |
| Result: |  |  | BCR is OK<br>NBV is as follows.... |
| Notional Business Value |  |  | 2,038,233 |
| Annual Repayments | Interest $178,095 | Principal $131,739 | $309,834 |
| Tax Payment (estimate): |  |  |  |
| Last year EBIT |  |  | $380,000 |
| less interest (estimate) |  |  | $178,095 |
| Tax Payment (estimate): | Tax Rate | 30% | $60,572 |
| Cash Available to Service Notional Business Value (CASNBV) |  |  |  |
| WANEBIT |  |  | $433,667 |
| less tax payment (estimate) |  |  | $60,572 |
| CASNBV |  |  | $373,095 |
| Free Cash Flow Factor |  |  |  |
| CASNBV |  |  | $373,095 |
| Annual Repayments (estimate) |  |  | $309,834 |
| Free Cash Flow Factor (times) |  |  | 1.20 |

Peak Notional Business Value Ratio

| Peak Notional Business Value | $2,038,233 |
|---|---|
| Total Income for Last Financial Year | $1,000,000 |
| Peak NBV Ratio (PNBVR) | 203.8% |

Notional Business Value

| PNBVR | 203.8% |
|---|---|
| Weighted Average Notional EBIT % | 43.4% |
| Notional Business Value | 2,038,233 |

Note: Based on three years availability of financial reports. If you have only two years, change weighting. That is, last financial year has a weighting of two, while earlier year has a weighting of one.
© Copyright Bstar IP Pty Ltd
No part of this file may be copied in whole or part or redistributed by any means without written consent from Bstar IP Pty Ltd A preferred embodiment of the method is also described in the following example.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

1. EXECUTIVE SUMMARY

1.1. Purpose

This independent Business Value Assessment ("BVA") has been conducted by Bstar Pty Ltd to assist with the Application from the Managing Director of the business for loan funding to assist with a business acquisition opportunity. This BVA is based on information provided by the business and Bstar's valuation methodology and is to be used by Bankwest for mortgage security purposes.

Business Name :           Better Advisers Pty Ltd
Owner/Managing Director     Travis Smith Business Opportunity       DEF Pty Ltd
Owner                       Brian Jones In determining the BVA, we have examined, and provide comment on, the factors that affect the overall value of the business. In particular, we have assessed the business background, prudential financing standards and value optimisation factors. These matters are addressed in this Report.

1.2. Introduction

Bstar has been engaged to conduct a valuation assessment on the business as part of the Bankwest Loan Application process.

This Report has been prepared for the sole use of Bankwest and for the above Purpose only. No other party is entitled to rely on anything contained in this Report without obtaining prior, express written approval from Bstar. Bstar will not be liable for any loss or suffering that may be caused by parties who fail to obtain such approval but who rely on any part of this Report.

1.3. Valuation

Bstar have calculated the Business Value for the business to be as follows :

| | |
|---|---|
| Notional WANEBIT | $315,000 |
| Capitalisation Factor | 4.45 |
| Business Value | $1,400,000 |

The basis of this valuation is discussed in further detail in this Report.

Note that this valuation is based on the earnings capacity of the business. Any future sale price for the business would need to be increased for any working capital (and decreased for any unrecorded liabilities and worn out fixed assets) that forms part of the business sale.

2. BUSINESS DIAGNOSTIC

2.1. Overview of the Existing Business

Travis is sole owner and Managing Director of Travis Investments, which Travis established 6 years ago. Travis conducted his work in Perth through Travis Investments.

Travis generated a fairly constant level of commission income - approximately $80,000. This level of income increased between July 2004 & December 2004.

Travis relocated from Perth to Noosa around the beginning of 2005, where he and a business partner started Better Insurance (each owning 50%).

Travis's business partner concentrates on the marketing whilst Travis is the head of sales. However, Travis's partner has scaled down his activity with Better Insurance to focus on alternative projects. Better Insurance has engaged Travis' partner, Ann Wilson, to conduct the marketing activity following the co-owner's change of direction.

Better Insurance has established a strong referral network in Noosa and has retained the vast majority of Travis's Perth clients (approximately 80 of them).

Better Insurance has actively attracted new clients and grown their business around the Sunshine Coast. With effective marketing and promotional activities the business has grown to have a total of over 200 clients (including Perth clients). In the six months ended 31 December 2005, Better Insurance recorded $245K in income.
During this period, Non Labour costs were $53,000.

Travis travels to Perth every quarter to service his Perth clients.

The only Labour costs associated with the business are those paid to Travis, the business partner and Ann his BDM and Office Manager, although Travis is mindful of the need to add new staff as his business grows.

The main activities of the business are:
- Life Insurance
- Income Protection
- Trauma
- Superannuation Advice Travis is planning to relocate his business to Burleigh Heads and to purchase the business of Brian Jones (DEF Pty Ltd), which has approximately 900 clients.

To do this, Travis will establish Better Advisers Pty Ltd and transfer his clients (approximately 75% of the clients of Better Insurance) to the new business. The clients acquired through the acquisition of DEF will also be administered through Better Advisers.

2.2. Business Opportunity

Travis has been offered the business of Brian Jones (DEF) for $360,000, payable 80% ($288,000) now and 20% ($75,000) in 12 months time.

Brian's business is located at Burleigh Heads and Travis will be able to occupy premises from where the business currently operates (for $400 a week)

Travis has discussed this opportunity with Brian and his enquiries into the business has revealed the following:

> Brian is 71 years old and has worked in his business for approximately 10 years. Although the business is growing, the growth is the result of 'passive referrals' – Brian undertakes practically no advertising or marketing.
>
> The business provides the following services:
> - ✓ Risk Insurance
> - ✓ Life Insurance
> - ✓ Superannuation Advice
>
> The business has a solid referral arrangement with the general insurance business with which they are co-located. Travis will be able to retain occupancy of this location, which provides excellent marketing opportunities.
>
> The business has a current annual trail level of approximately $120,000 (with New Business of approximately $85,000). Variations to these amounts provide the 2005 Operating Income figure of $230k.

3. VALUE OPTIMISATION

3.1. Key Components

There are 5 key success factors that determine business value. These factors indicate the degree to which a business may be able to increase its value and identify areas where the business may be at risk from inappropriate management practices.

This Section has been completed from Worksheets and Comments provided by Travis.

| Key Components | Rating<br>Poor (1) → Very Good (5) |
|---|---|
| Management Information Systems | 5.0 |
| Management, Business and Personal Experience | 5.0 |
| Customers and Market Demand | 4.8 |
| Human Resource Management (HRM) | 5.0 |
| Growth, Succession and Estate Planning | 3.8 |

3.2. Management Information Systems

Management Information Systems (MIS) provide business owners and managers with accurate and timely information. Job costing, customer relationship management (CRM) and management accounting systems are examples of a functioning MIS.

Travis has established a solid management reporting framework with his accountant and has manuals in place for his key procedures.

3.3. Management, Business and Personal Experience

The business owner has a solid knowledge of the business. Importantly, the business owner recognises the need to seek external professional assistance where necessary and to establish a balance between business and family life

3.4. Customers and Market Demand

The business owner has a thorough understanding of the products and services that are relevant to the industry and is aware of the opportunities available through market/customer analysis and the need to deliver a high level of customer service.

3.5. Human Resource Management

The business owner, being is aware of (and either adopts or is in the process of adopting) contemporary HR management techniques.

3.6. Growth, Succession and Estate Planning

The business does have a certain level of dependence on Travis, who recognises this and appreciates that as the business grows he can train and mentor incoming key staff members to be able to run the business in his absence.

4. BUSINESS VALUE ASSESSMENT

4.1. Reason for Assessment

The business has engaged Bstar to conduct a business valuation assessment to assist with their Funding Application.

4.2. Assessment Methodology

The Business Value Assessment is a valuation model that determines a value for a business based on the business generating an acceptable return to an owner during a defined investment period. The valuation methodology considers:

1. Profitability and Servicing - the business generating sufficient cash flows after tax (from profits) to provide a return on business investment;
2. Investment Payback Period - the maximum investment period based on an assessment of business risk;
3. Cost of Capital - most small to medium enterprise business investment is funded by bank debt.

A key component in calculating business value is the determination of an appropriate capitalisation factor. It will vary from business to business.

The valuation methodology determining the appropriate capitalisation factor is based on quantitative and qualitative analysis of all facets of business operations and incorporates the principles of Porters Five-Forces Model, financial modelling and generally accepted credit standards.

Porters Five Forces are considered at Appendix 5.2. Appendix 5.2 shows that the business operates within a strong and relatively stable industry.

However, all parties must be aware of the need to continually identify, assess and manage business risks that exist in today's dynamic environment.

Section 3 of this Report shows that the business is well managed.

These factors, combined with Travis's industry knowledge, age and commitment suggests that the business operates in a low risk environment.

The Bstar Business Value Assessment methodology is accepted by leading national banks, professional advisers and key industry groups. It allows for an effective credit risk minimisation strategy.

4.3. Assumptions

The Business Value Assessment has been calculated on the following assumptions.

| STANDARD | FACTOR | COMMENTS |
|---|---|---|
| Debt Coverage Multiple | 1.3 | The minimum acceptable debt coverage ratio is 1.2 We have applied a factor of 1.3 to reflect the uncertainty that exists with acquisitions and establishing a new business in a new location |
| Investment Payback Period | 10 years | A generally accepted range of 3-10 years can apply, depending upon matters affecting the business environment We have used a payback period of 10 years due to the low risk environment that the business appears to operate within |
| Cost of Capital | 9% | Standard market rates for commercial borrowings |
| Tax Rate | 30% | We have assumed that any sale of the business will be into a corporate structure and that a 30% tax rate will apply |
| Earnings Before Interest and Tax | $315,000 | We have assumed that the business generates the profits/earnings as per Appendix 5.1. As the business has no history of sustaining this level of earnings, this Report has based its valuations on this level of earnings. |

4.4. Value Assessment

Bstar have calculated the Business Value for the business to be as follows:

| Notional WANEBIT | $315,000 |
|---|---|
| Capitalisation Factor | 4.45 |
| Business Value | $1,400,000 |

4.5. Approved

This Business valuation Assessment is approved:

Signed : _____    Date : _____

Name : Grant Bloxham, CEO

5. APPENDICES

5.1. Notional EBIT Calculations i) Better Advisers : Better Insurance and DEF – Combined

|  | 2006 Notional 12 months $'000 | Adjusted 2006 Notional 12 months $'000 |
|---|---|---|
| INCOME | | |
| Commissions received | 615 | 615 |
| Total Income | 615 | 615 |
| | | |
| EXPENSES | | |
| Wages – owner | 159 | 90 |
| Wages - staff | 70 | 70 |
| Superannuation | 15 | 15 |
| Advertising | 10 | 10 |
| Client rebates | 30 | 30 |
| Depreciation | 4 | 4 |
| Postage, stationery etc | 14 | 14 |
| Insurance | 10 | 10 |
| Rent - office | 21 | 21 |
| Telephone | 10 | 10 |
| Travel | 8 | 8 |
| Other | 19 | 18 |
| Total Expenses | 369 | 300 |
| | | |
| PROFIT/EBIT | 246 | 315 |
| | 40% | 51% |

The unadjusted column shows the notional Net profit on the basis that Travis sets his wage at a level to generate a 40% Profit.

The Notional 2006 figures have been determined by adding together the 2006 Notional Results for Better Insurance and DEF. The results for the individual businesses are included in the following pages of this Report.

For these purposes, adjustments have been made to the following figures to derive the above amounts:

| | |
|---|---|
| Income | Recognise that approx $100k will be retained by Insurance Champions |
| Wages | Assume that Travis and Ann can operate the business at this scale |
| Rent | New premises can be leased at $400 per week |
| Other expenses | To recognise duplication of certain expenses in "Other" | ii) Better Insurance

|  | As per accounts 2005 Total 12 months $'000 | Adjusted 2005 Notional 12 months $'000 | As per accounts 2006 Total 6 months $'000 | Adjusted 2006 Notional 6 months $'000 | Adjusted 2006 Notional 12 months $'000 |
|---|---|---|---|---|---|
| INCOME |  | See Note |  |  |  |
| Commissions Received | 160 | 193 | 245 | 245 | 500 |
| Other |  |  |  |  |  |
| Total Income | 160 | 193 | 245 | 245 | 500 |
|  |  |  |  |  |  |
| EXPENSES |  |  |  |  |  |
| Wages - Owner | 47 | 63 | 68 | 45 | 90 |
| Wages - BDM |  |  | 41 | 35 | 70 |
| Superannuation |  | 6 | 2 | 8 | 14 |
| Advertising | 13 | 10 | 5 | 5 | 10 |
| Client Rebates | 1 |  | 16 | 16 | 30 |
| Depreciation | 15 | 2 | 3 | 1 | 2 |
| Postage, printing, stationery | 8 | 8 | 6 | 6 | 10 |
| Finance Charges | 5 |  |  |  |  |
| Insurance | 3 | 3 |  | 2 | 2 |
| Vehicle | 15 |  |  |  |  |
| Rent - office | 10 | 10 | 9 | 9 | 18 |
| Telephone | 5 | 5 | 3 | 3 | 6 |
| Travel | 13 | 11 | 4 | 4 | 9 |
| Other |  |  | 7 | 7 | 15 |
| Total Expenses | 145 | 121 | 164 | 141 | 275 |
|  |  |  |  |  |  |
| PROFIT/EBIT | 15 | 12 | 81 | 104 | 225 |
|  |  |  |  | 42% | 45% |

Note :

The 2005 results do not reflect the current performance of the business. The 2005 results above are the combination of 6 months of Perth based activity and 3 to 4 months of Perth/Noosa activity. During this period Travis's attention was diverted away from the business as he organised the relocation and set up the new business in Noosa.

The 2005 results have accordingly not been included in assessing the performance of the business for valuation purposes.

iii) DEF

| | As per accounts 2005 Total 12 months $'000 | Adjusted 2005 Notional 12 months $'000 | As per accounts 2006 Total 9 months $'000 | Adjusted 2006 Notional 9 months $'000 | Adjusted 2006 Notional 12 months $'000 |
|---|---|---|---|---|---|
| INCOME | | | | | |
| Commissions Received | 231 | 231 | 162 | 162 | 215 |
| Expense recoveries | 3 | | 2 | | |
| Rents received | 18 | | 4 | | |
| Other | | | | | |
| Total Income | 252 | 231 | 168 | 162 | 215 |
| | | | | | |
| EXPENSES | | | | | |
| Wages - Owner | 67 | 70 | 61 | 55 | 72 |
| Wages – staff | 17 | | | | |
| Superannuation - Owner | 61 | 6 | 6 | 5 | 6 |
| Superannuation - Staff | 1 | | | | |
| Depreciation - equipment | 4 | 4 | 3 | 2 | 2 |
| Depreciation - property | 4 | | 3 | | |
| Electricity | 5 | 5 | 4 | 4 | 5 |
| Postage, printing, stationery | 3 | 3 | 3 | 3 | 4 |
| Insurance | 2 | 2 | 8 | 8 | 8 |
| Rent - office | 27 | 27 | 21 | 21 | 30 |
| Interest/lease charges | 21 | | 1 | | |
| Repairs | 9 | | 1 | | |
| Telephone | 7 | 7 | 3 | 3 | 4 |
| Vehicle | 11 | | 7 | | |
| Other | 11 | 11 | 4 | 4 | 6 |
| Total Expenses | 250 | 135 | 125 | 105 | 137 |
| | | | | | |
| PROFIT/EBIT | 2 | 96 | 43 | 57 | 78 |
| | | 41% | | 35% | 36% |

5.2. Porters Five Forces 5.2.1 Bargaining Power of Suppliers

Main Supplies procured by the business:
1. Financial Service products

| Consideration | Risk Exists ? | Risk is Significant (score 1 to 5, 1 is minimal; 5 is high) |
|---|---|---|
| Supply market is dominated by a few large suppliers | N | |
| The business is restricted in its possible number of sources for these supplies | N | |
| Suppliers are concentrated (bargaining power is high) | N | |
| Changing suppliers is costly/difficult | N | |
| Suppliers may 'forward integrate' and become a competitor | Y | 1 |
| The customers of the business are able to influence which suppliers are engaged by the business | Y | 1 |

Comments

The risks identified above are really 'in theory' risks.

5.2.2 Bargaining Power of Customers

| Consideration | Risk Exists? | | | Risk is Significant (score 1 to 5; 1 is minimal; 5 is high) |
|---|---|---|---|---|
| The Buying Industry is dominated by a few large customers | Y | N | NA | |
| The business's current customer mix is dominated by a few large customers | Y | N | NA | |
| The business has no or little product/service differentiation | Y | N | NA | 1.5 |
| Customers may 'backward integrate' and become a competitor | Y | N | NA | |
| Customers can continue to operate without the products/services provided by the business | Y | N | NA | |
| The business has high levels of fixed costs | Y | N | NA | |
| The customer can easily change suppliers | Y | N | NA | 2.5 |
| Customers are price sensitive | Y | N | NA | 1.5 |

Comments

The main points of differentiation between firms in the industry are:
1. marketing activity
2. hours worked
3. client service Younger, more dynamic business owners tend to perform better with regards to these issues that older owners.

Whilst customers can in theory change suppliers they will normally do so if they become dissatisfied with the client service they receive.

Clients are price sensitive to a degree – they are willing to pay for good advice and they do not always know what other suppliers charge.

5.2.3 Threat of New Entrants

| Consideration | Risk Exists? | Risk is Significant (score 1 to 5 1 is minimal; 5 is high) |
|---|---|---|
| Low financial cost of entry exists for new entrants | Y | 2 |
| Low technical/regulatory/Intellectual Property cost of entry exists for new entrants | N | |
| Resources (including labour and access to distribution channels) required for a new entrant are readily accessible | Y | 2 |
| Customers have low levels of brand loyalty | N | |
| Industry is seen as buoyant and profitable | Y | 2.5 |
| New competitors can survive on low market share | Y | 2.5 |
| Low cost exists for unsuccessful new entrants | Y | 1.5 |

Comments

The industry is based to some extent on reputation and existing relationships. If a business continues to provide good quality staff to its customers and as long as relationships are maintained, customers do not generally shop around.

As the economy and population of Australia continues to develop, it is generally seen that the industry can sustain/actually needs new entrants and/or new advisers.

Although entrants do not require any significant capital outlay, the time required to set up a new business may be prohibitive to some..

5.2.4 Threat of Substitutes

| Consideration | Risk Exists? | Risk is Significant (score 1 to 5 1 is minimal; 5 is high) |
|---|---|---|
| Customers have low levels of brand loyalty | N | |
| The customer can easily substitute its requirements | N | |
| Substitutes can be provided in a cost effective manner | N | |

Comments
Nil 5.2.5 Competitive Rivalry Between Existing Players

| Consideration | Risk Exists ? | Risk is Significant (score 1 to 5 1 is minimal; 5 is high) |
|---|---|---|
| The market comprises a number of similar sized businesses | Y | 2.5 |
| Competitors have aggressive growth strategies | Y | 2 |
| Little product/service differentiation exists | Y | 1.5 |
| Low market growth exists | N | |
| Fixed costs in the industry are high (therefore high revenues are required) | N | |
| Storage costs are high and/or perishable goods are involved | NA | |
| Exit costs are high | N | |
| Competitors have access to greater resources than the business | Y | 1 |
| Switching costs are low for the customer | Y | 3 |

Comments

Some competitors are quite dynamic and aggressive (mainly those owned by younger advisers) ; others are quite passive (eg Brian Jones). The rate of growth in the industry can accommodate aggressive growth strategies.

Although product differentiation is low, service differentiation is high as customers build a relationship of trust with their adviser.

Whilst some competitors may have access to greater cash reserves than Travis, Travis is able to demonstrate that he possesses the main resources that are required to remain competitive (being strong industry knowledge, marketing ability and strong work ethic).

Switching costs for customers are low, which as well as being a risk for Travis, presents an excellent opportunity.

5.2.6 Summary

| Force | Number of Considerations | Number NAs | Number Answered | Max Risk Score | Risk Score | % |
|---|---|---|---|---|---|---|
| Bargaining Power of Suppliers | 6 | | 6 | 30 | 2 | 6% |
| Bargaining Power of Customers | 8 | | 8 | 40 | 5.5 | 13% |
| Threat of New Entrants | 7 | | 7 | 35 | 10.5 | 30% |
| Threat of Substitutes | 3 | | 3 | 15 | 0 | 0% |
| Competitive Rivalry Between Existing Players | 9 | 1 | 8 | 40 | 10 | 25% |
| Total | 33 | 1 | 32 | 160 | 28 | 17% |

Appendix 1

Capitalisation Rates : Comparisons of Capitalisation Rates with recent, similar Transition events 1    Compared to Notional Valuations of Similar Businesses Determined by Other Banks (values determined by reference to 3 times weighted average renewal income)

| Total Income | Profit | Value | Capitalisation Rate* | Loan Amount |
|---|---|---|---|---|
| $550,000 | $199,000 | $1.26m | 6.36 | $747,000 |
| $554,000 | $176,000 | $0.86m | 4.91 | $500,000 |
| $555,000 | $229,000 | $1.22m | 5.32 | $680,000 |
| $584,000 | $145,000 | $0.90m | 6.23 | $380,000 |
| $593,000 | $160,000 | $0.80m | 4.99 | $525,000 |
| $615,000 | $269,000 | $1.40m | 5.20 | $350,000 |
| $642,000 | $205,000 | $1.54m | 7.52 | $723,000 |
| $655,000 | $269,000 | $1.20m | 4.47 | $786,000 |
| $674,000 | $207,000 | $1.06m | 5.10 | $510,000 |

* based on Accounting Profit, not EBIT

2    Compared to Valuations Determined by Bstar

| Industry | EBIT | Value | Capitalisation Rate |
|---|---|---|---|
| Financial Services | $283,000 | $1.4m | 5.06 |
| Recruitment | $300,000 | $1.3m | 4.45 |
| Financial Services | $315,000 | $1.4m | 4.45 |
| Engineering | $332,000 | $1.6m | 4.80 |
| Accountancy | $566,000 | $2.5m | 4.47 |

This example is based upon valuing a business as a part of a prospective purchase.

The invention claimed is:

1. A data processing system for valuing a business including a hardware component including
   a. processing means for processing data;
   b. storage means for storing data;
   c. input means for inputting data related to the financial performance of a business to be valued, including at least an income component, and an expense component into the processing means;
   d. input means for inputting an assumed business capitalisation rate (BCR) appropriate for the business and industry of the business to be valued into the processing means, the assumed BCR established by assessing the business background for the business to be valued and establishing value optimization factors that determine business value in the light of the business background and the relevant industry of the business to be valued;
   e. the processing means is adapted for calculating a weighted average notional earning before interest and tax (WANEBIT) based on historical financial records of the business to be valued; and
   f. the processing means also being adapted for generating a calculated net business value using the WANEBIT and the assumed BCR;
   g. the processing means also adapted for checking that the assumed BCR used is valid by calculating a peak notional business value ratio (PNBVR) of net business value from step (e) to total income for an appropriate historical period, calculating WANEBIT as a percentage of total income for the appropriate historical period, calculating a calculated business capitalisation rate as a ratio of PNBVR to WANEBIT as a percentage of total income, and comparing the calculated business capitalisation rate to the assumed BCR.

2. A data processing system according to claim 1 further including the processing means being adapted for calculating a free cash flow factor to ascertain ability of a business to finance a debt by:
   i. Calculating the business tax liability based on historical financial data;
   ii. Calculating cash available based on WANEBIT less business tax liability; and
   iii. Calculating free cash flow factor according to the ratio of cash available to repayment amounts with a minimum acceptable value of 1.2.

3. A data processing system according to claim 1 further including the processing means being adapted for checking that the assumed business capitalisation rate (BCR) is viable by:
   i. calculating a peak notional business value ratio (PNBVR) using the calculated net business value and to total income for an appropriate historical period;
   ii. calculating WANEBIT as a percentage of total income for the historical period;
   iii. calculating a second calculated business capitalisation rate as a ratio of PNBVR to WANEBIT as a percentage of total income; and
   iv. iteratively comparing the second calculated business capitalisation rate to calculated business capitalisation rate.

4. A data processing system for valuing a business including a computer hardware component including:
   a. processing means for processing data;
   b. storage means for storing data;
   c. input means for inputting data related to the financial performance of a business to be valued, including at least an income component, and an expense component into the processing means;
   d. input means for establishing an assumed business capitalisation rate (BCR) appropriate for the business and industry of the business to be valued into the processing means, the assumed BCR established by assessing the business background for the business to be valued and establishing value optimization factors that determine business value in light of the business background and the relevant industry of the business to be valued;
   e. the processing means including a first set of instructions for calculating a weighted average notional earning before interest and tax (WANEBIT) based on historical financial records of the business to be valued; and
   f. the processing means including a second set of instructions for calculating net business value using the WANEBIT and the assumed BCR; and g) the processing means including a third set of instructions for checking that the assumed business capitalisation rate (BCR) is viable, by:
      i. calculating a peak notional business value ratio (PNBVR) of net business value and total income for an appropriate historical period;
      ii. calculating WANEBIT as a percentage of total income for the appropriate historical period;
      iii. calculating a calculated business capitalisation rate as a ratio of PNBVR to WANEBIT as a percentage of total income; and
      iv. comparing the calculated business capitalisation rate to the assumed business capitalisation rate.

5. A data processing system according to claim 4 wherein the input BCR is calculated prior to input based on:
   a. current interest rate;
   b. capitatisation period;
   c. tax rate;
   d. free cash flow factor;
   wherein a correlation exists between these variables and the input BCR is calculated based on the correlation.

6. A data processing system according to claim 1 including a valuation model that determines a value for a business based on the business generating an acceptable return to an owner during a defined investment period.

7. A data processing system according to claim 6 wherein the valuation methodology considers at least one factor chosen from the group including:
   a. the business generating sufficient cash flows after tax (from profits) to provide a return on business investment;
   b. the maximum investment period based on an assessment of business risk; and
   c. the cost of capital.

8. A data processing system according to claim 7 wherein valuation model includes the adoption of a value for at least one parameter chosen from the group including:
   a. Debt Coverage Multiple;
   b. Investment Payback period;
   c. Cost of Capital;
   d. Tax Rate; and
   e. Earnings before interest and tax.

9. A data processing system according to claim 8 wherein an acceptable Debt Coverage Multiple ratio is between 1.2 and 1.5.

10. A data processing system according to claim 6 wherein the Earnings Before Interest and Tax (EBIT) figure is weighted according to the year in which the earnings occurred.

11. A data processing system according to claim 6 wherein the Earnings Before Interest and Tax (EBIT) figure is adjusted for any non-commercial items such as intra-group sales/purchases at non-market rates, or above market rates of superannuation paid to owners.

12. A method for valuing a business including:
   inputting data related to the financial performance of a business to be valued, including at least an income component, and an expense component into a processing means;
   inputting an assumed business capitalisation rate (BCR) appropriate for the business and industry of the business to be valued into the processing means, the assumed BCR established by assessing the business background for the business to be valued and establishing value optimization factors that determine business value in the light of the business background and the relevant industry of the business to be valued;
   calculating a weighted average notional earning before interest and tax (WANEBIT) based on historical financial records of the business to be valued;
   calculating a net business value using the WANEBIT and the assumed BCR; and verifying that the assumed BCR used is valid by:
      (i.) calculating a peak notional business value ratio (PNBVR) of net business value from step (e) to total income for an appropriate historical period,
      (ii.) calculating WANEBIT as a percentage of total income for the appropriate historical period,
      (iii.) calculating a calculated business capitalisation rate as a ratio of PNBVR to WANEBIT as a percentage of total income, and
      (iv.) comparing the calculated business capitalisation rate to the assumed BCR.

13. The method of claim 12 further including calculating a free cash flow factor to ascertain ability of a business to finance a debt by:
   i. calculating the business tax liability based on historical financial data;
   ii. calculating cash available based on WANEBIT less business tax liability; and
   iii. calculating free cash flow factor according to the ratio of cash available to repayment amounts with a minimum acceptable value of 1.2.

14. The method of claim 12 further including checking that the assumed business capitalisation rate (BCR) is viable by:
   i. calculating a peak notional business value ratio (PNBVR) using the calculated net business value and total income for an appropriate historical period;
   ii. calculating WANEBIT as a percentage of total income for the historical period;
   iii. calculating a second calculated business capitalisation rate as a ratio of PNBVR to WANEBIT as a percentage of total income; and
   iv. iteratively comparing the second calculated business capitalisation rate to calculated business capitalisation rate.

15. The method of claim 12 wherein the input BCR is calculated prior to input based on:
   a. current interest rate;
   b. capitalisation period;
   c. tax rate;
   d. free cash flow factor;
   wherein a correlation exists between these variables and the input BCR is calculated based on the correlation.

16. The method of claim 12 further including a valuation model that determines a value for a business based on the business generating an acceptable return to an owner during a defined investment period.

17. The method of claim 12 wherein the valuation methodology considers at least one factor chosen from the group including:
   a. the business generating sufficient cash flows after tax (from profits) to provide a return on business investment;
   b. the maximum investment period based on an assessment of business risk; and
   c. the cost of capital.

18. The method of claim 17 wherein valuation model includes the adoption of a value for at least one parameter chosen from the group including:
   a. Debt Coverage Multiple;
   b. Investment Payback period;
   c. Cost of Capital;
   d. Tax Rate; and
   e. Earnings before interest and tax.

* * * * *